US010053927B2

(12) United States Patent
Morris et al.

(10) Patent No.: US 10,053,927 B2
(45) Date of Patent: Aug. 21, 2018

(54) MULTI-CONDUIT COILED TUBING ASSEMBLY INCLUDING PIVOTAL CLAMPING MEMBERS

(71) Applicant: CJS Production Technologies Inc., Calgary (CA)

(72) Inventors: Collin Rickey Morris, Calgary (CA); John Rickey Morris, Calgary (CA)

(73) Assignee: CJS Production Technologies Inc., Calgary (CA)

( * ) Notice: Subject to any disclaimer, the term of this patent is extended or adjusted under 35 U.S.C. 154(b) by 0 days.

(21) Appl. No.: 15/526,647

(22) PCT Filed: Nov. 3, 2015

(86) PCT No.: PCT/CA2015/051122
§ 371 (c)(1),
(2) Date: May 12, 2017

(87) PCT Pub. No.: WO2016/074073
PCT Pub. Date: May 19, 2016

(65) Prior Publication Data
US 2017/0321497 A1 Nov. 9, 2017

Related U.S. Application Data

(60) Provisional application No. 62/079,308, filed on Nov. 13, 2014.

(51) Int. Cl.
*E21B 17/04* (2006.01)
*E21B 17/20* (2006.01)
(Continued)

(52) U.S. Cl.
CPC ............ *E21B 17/203* (2013.01); *F16L 3/237* (2013.01); *F16L 9/19* (2013.01)

(58) Field of Classification Search
CPC ........ E21B 17/203; E21B 17/04; E21B 17/18; E21B 19/22; F16L 3/237; F16L 9/19; F16L 3/22; F16B 7/0433
(Continued)

(56) References Cited

U.S. PATENT DOCUMENTS 4,601,334 A * 7/1986 Lovegrove .......... E21B 17/1035
138/110
5,806,615 A * 9/1998 Appleton ............ E21B 17/1078
138/110
(Continued)

FOREIGN PATENT DOCUMENTS

| CA | 2867221 | 9/2013 |
| FR | 2826051 | 12/2002 |
| GB | 2297337 | 7/1996 |

*Primary Examiner* — Anita M King
(74) *Attorney, Agent, or Firm* — Ryan W. Dupuis; Ade & Company Inc.; Kyle R. Satterthwaite

(57) ABSTRACT

In a coiled tubing assembly for use in a wellbore, the tubing assembly uses longitudinally spaced apart clamping members to clamp two or more coiled tubing members alongside one another. Each clamping member includes a clamping portion extending circumferentially about each coiled tubing member so as to be rotatable in relation thereto, and a connecting portion joined between the clamping portions. A longitudinal positioning element is fixed relative to one of the tubing members in association with each clamping member such that the clamping member remains pivotal relative to the positioning element and the tubing members upon which it is fixed. The longitudinal positioning element thus only restricts the respective clamping assembly in the longitudinal direction along the tubing members without restricting relative twisting between the tubing members.

18 Claims, 3 Drawing Sheets

(51) Int. Cl.
*F16L 3/237* (2006.01)
*F16L 9/19* (2006.01)
(58) Field of Classification Search
USPC .......................................................... 248/68.1
See application file for complete search history.

(56) References Cited

U.S. PATENT DOCUMENTS 6,305,476 B1    10/2001  Knight
9,714,728 B2 *  7/2017  Chen ....................... F16L 3/237

* cited by examiner

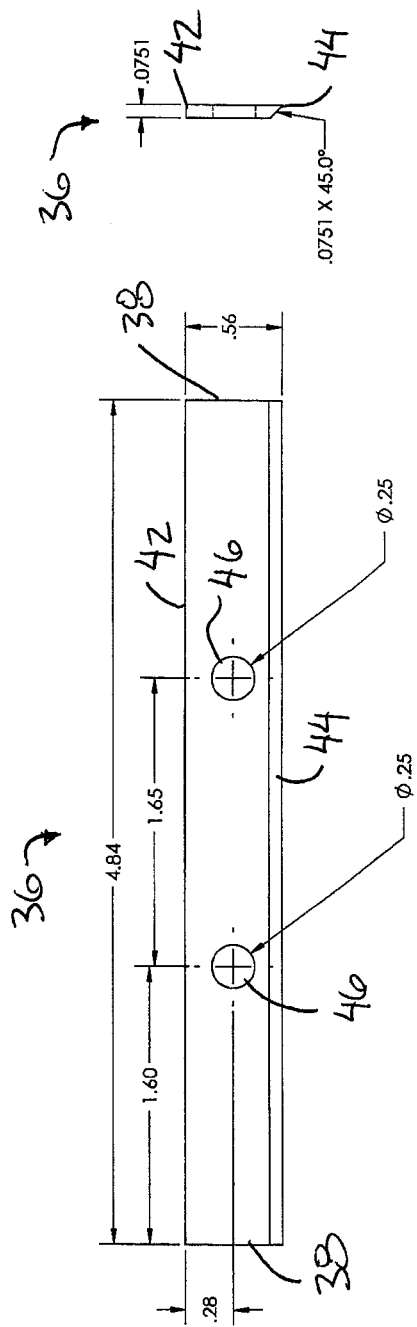

MULTI-CONDUIT COILED TUBING ASSEMBLY INCLUDING PIVOTAL CLAMPING MEMBERS

FIELD OF THE INVENTION

The present invention relates to a coiled tubing assembly including two or more independent, continuous tubing members connected at intervals by clamping members such that the tubing members extend alongside one another such that the strings can be simultaneously spooled and/or conveyed relative to a wellbore, and more particularly the present invention relates to clamping members which clamp onto the tubing members such that the tubing members remain pivotal relative to the clamp members.

BACKGROUND

Currently, and in the past, multi-conduit tubulars consisted of either concentric conduits with one inside the other, or integrally joined conduits aligned on the same horizontal plane and covered in an overall jacket of plastic to provide a unitary assembly. One type of integrally joined conduits is available under the trademark name Flatpak™. These items have several inherent limitations in some applications. For example, concentric coil is expensive to manufacture, and difficult to handle. FlatPak™ has temperature limitations due to the external jacket limits and may see premature wear on its external jacket in extreme wellbore conditions and due to equipment problems.

These previous designs were designed to provide methods of deploying and extracting multiple tubular for a variety of purposes, including service and completion work, without the need to hard connect or weld the conduits together. Welding the conduits together is not desirable because the heat affected areas of the continuous tubular do not cycle repeatedly or predictably as the original tubing members are designed for, nor do the heat affected areas resist corrosion as the original tubing members are designed to do.

As in all multiple tubular designs, it is imperative that the tubing members are connected in such a manner that when one tubular wants to move, the other tubular must move, or resist that movement equally, resulting in a product that moves together, even though it consists of many parts. This is especially important when using multiple sizes, and grades of continuous tubing members, because when you continuously deploy these products, the individual tubes will want to stretch, expand, contract, and helix at different rates, and under different conditions. This is why welding the tubes along their vertical line is not recommended, as welding various types of metals together is very tricky. Furthermore, cycling them would become very unpredictable, as the stresses would want to break them apart.

Using conventionally available clamps designed to clamp tubing members together also has inherent flaws. Typically when installed on a continuous coiled tubing member, the clamps are able to slide up and down the coil as they are not directly attached to the coil, and the coil can be slightly undersized at times from the manufacturer, or it can see reduced O.D. from stretch, working (cycling), or from temperature changes. Whenever a size change occurs, the clamps could slip, resulting in large sections of the overall package with no clamps at all, allowing the individual strings to "bow" or "flex" at will, and possibly resulting in a large number of clamps all stacked up in one spot. Known clamp designs are also generally unable to be spooled and thus are required to be installed as the tubing is injected into the wellbore.

U.S. Pat. No. 5,379,836 by Jordan discloses a clamp for use with a well tubular, and more particularly to a clamp for joining auxiliary electrical lines alongside a wellbore tubing member. The clamp relies on being clamped overtop of joint in discontinuous jointed tubing in order to prevent sliding misplacement of the clamp along tubing member. Without the interlocking connection of the clamp body about axially opposed ends of an enlarged connection in the jointed tubing, the clamp design is not suited to remaining fixed in position along the tubing member and thus is unsuitable for use with continuous coiled tubing members. Furthermore, the clamp cannot be spooled as it must be installed on the jointed tubing as the tubing is joined prior to insertion into a wellbore.

WO 2013/134868 by Morris, filed Mar. 5, 2013 discloses a coiled tubing assembly for use in a wellbore which includes at least two continuous coiled tubing members which are joined by clamp assemblies at longitudinally spaced positions. Each clamp assembly has a central portion spanning between the spaced apart coiled tubing members and clamping portions joined to the central portion to extend about the tubing members respectively. Each clamping portion is maintained in an elastically stretched state in a circumferential direction about the respective tubing member such that the internal circumference of the clamping portion is arranged to be elastically reduced about the respective tubing member when the tubing member stretches longitudinally in use within a wellbore. Use of tension by the elastic stretching of the clamping portions about the tubing members alone however may be insufficient to hold the longitudinal position of the clamping members in some instances. Welding one or more clamping portions to the respective tubular member is sufficient to maintain the longitudinal position of the clamping members in some instances. In longer runs of tubing members however, the relative twisting of the coiled tubing members resulting from unspooling may result in breakage of the longitudinal positioning welds such that the clamps are again unable to be held in the longitudinal direction along the tubular members.

SUMMARY OF THE INVENTION

According to one aspect of the present invention there is provided a coiled tubing assembly arranged for use in a wellbore, the tubing assembly comprising:

at least two continuous coiled tubing members, each defining a respective conduit extending in a longitudinal direction and arranged to receive wellbore fluids longitudinally therethrough; and a plurality clamp assemblies connecting the tubing members to one another at respective clamping locations spaced apart from one another in the longitudinal direction such that the tubing members extend alongside one another in a parallel configuration;

each clamp assembly comprising:

a clamping portion extending circumferentially about each coiled tubing member which is sized so as to allow some relative pivotal movement therebetween;

at least one connecting portion joined between one clamping portion and at least one other adjacent clamping portion such that the clamping portions are interconnected; and a longitudinal positioning element fixed relative to one of the tubing members so as to be arranged to restrict longitudinal displacement of the clamp assembly relative to said one of the tubing members;

the clamp assembly being pivotal relative to the longitudinal positioning element about a longitudinal axis of the tubing member upon which the longitudinal positioning element is fixed.

The tubing assembly according to the present invention addresses the need to connect tubing members with a metal medium. More particularly, the tubing assembly is preferably an all metal multi-conduit consisting of two or more independent continuous coiled tubing strings, connected at intervals with specially designed clamps that allow for the individual tubulars to be continuously deployed and extracted into and out of well bores as one cohesive unit. Accordingly a user can simultaneously inject fluids/gases down one or more conduits and recover fluids/gases via other conduits without the need for any large amount of welding, or otherwise using heat treatments to weld the tubulars directly to one another, thus avoiding substantially changing the metallic structure of the tubulars. More particularly, the use of a longitudinal positioning element which fixes the longitudinal position of the clamp but which remains rotatable relative to the clamping portions ensures that the tubing members remain free to pivot relative to the clamping assemblies to relieve torsional stresses resulting from unspooling. Fixing the longitudinal position of each clamp assembly ensures that the clamping assemblies do not slide along the tubing members when the tubing members are stretched in a suspended and working position downhole, thus preventing the clamping members from bunching up together and causing kinking of the tubing members during spooling.

Preferably the clamping portions of each clamping assembly include a first clamping portion extending circumferentially about a first one of the tubing members and a second clamping portion extending circumferentially about a second one of the tubing members and which is joined to the first clamping portion by said at least one connecting portion, and wherein the longitudinal positioning element extends circumferentially about the second one of the tubing member in fixed relation thereto.

Preferably one of the second clamping portion and the longitudinal positioning element comprises a sleeve supported concentrically on the second one of the tubing members and another one of the second clamping portion and the longitudinal positioning element comprises a pair of collars supported concentrically on the second one of the tubing members at longitudinally opposed ends of the sleeve.

Preferably an annular gap is provided between the sleeve and each collar in the longitudinal direction of the second one of the tubing members to allow some relative flexing with the tubing members while spooling.

In the illustrated embodiment, the second clamping portion comprises the sleeve such that the sleeve is fixed to said at least one connecting portion and the longitudinal positioning element comprises the pair of collars such that the pair of collars are fixed to the second one of the tubing members. Preferably each collar of the pair of collars comprises an inner annular end face arranged to abut the sleeve and an outer end face which is chamfered so as to be reduced in outer diameter in a longitudinally outward direction.

Preferably a combined length of the second clamping portion and the longitudinal positioning element along the second one of the tubing members is approximately equal to a length of the first clamping portion along the first one of the tubing members.

The first clamping portion may extend longitudinally between opposing outer end faces which are chamfered so as to be reduced in outer diameter in a longitudinally outward direction.

The connecting portion is preferably connected in fixed relation to each of the clamping portions. More particularly, the connecting portion and the clamping portions may be integrally formed with one another as a single unitary body. The clamping portions and connection portion may be formed of a common elastically deformable material.

Preferably the longitudinal positioning element is welded to said one of the coiled tubing members relative to which the longitudinal positioning element is fixed.

The longitudinal positioning element may be fixed by a plurality of individual welds between the longitudinal positioning element and said one of the coiled tubing members at spaced apart positions from one another.

Preferably each clamping portion includes at least one slotted opening communicating radially from an inner surface to an outer surface of the clamping portion, in which the slotted opening is elongated in a circumferential direction so as to extend partway about a circumference of the respective coiled tubing member received through the clamping portion. The slots in the clamping portions enable the clamping portions to better flex with the coiled tubing members extending longitudinally therethrough as the coiled tubing members are spooled and unspooled, for extending the life of the clamps and the tubing members. When the clamping portions have respective longitudinal axes lying in a common plane, preferably the slotted openings comprise a plurality of slotted openings in opposing sides of the respective clamping portion relative to said common plane.

The longitudinal positioning element may be supported about said one of the tubing members in an elastically stretched state.

The assembly may further include an annular spacer element formed of consumable material mounted between each clamping portion and the respective tubing member. A suitable consumable material may comprise paper for example.

Preferably the clamping portions have respective inner diameters which are substantially identical to one another.

Some embodiments of the invention will now be described in conjunction with the accompanying drawings in which:

BRIEF DESCRIPTION OF THE DRAWINGS

FIG. 4 is a plan view of a plate metal blank used to form each one of the two collars of the longitudinal positioning element; and FIG. 5 is an end view of the plate metal blank according to FIG. 4.

In the drawings like characters of reference indicate corresponding parts in the different figures.

DETAILED DESCRIPTION

Figure 1:
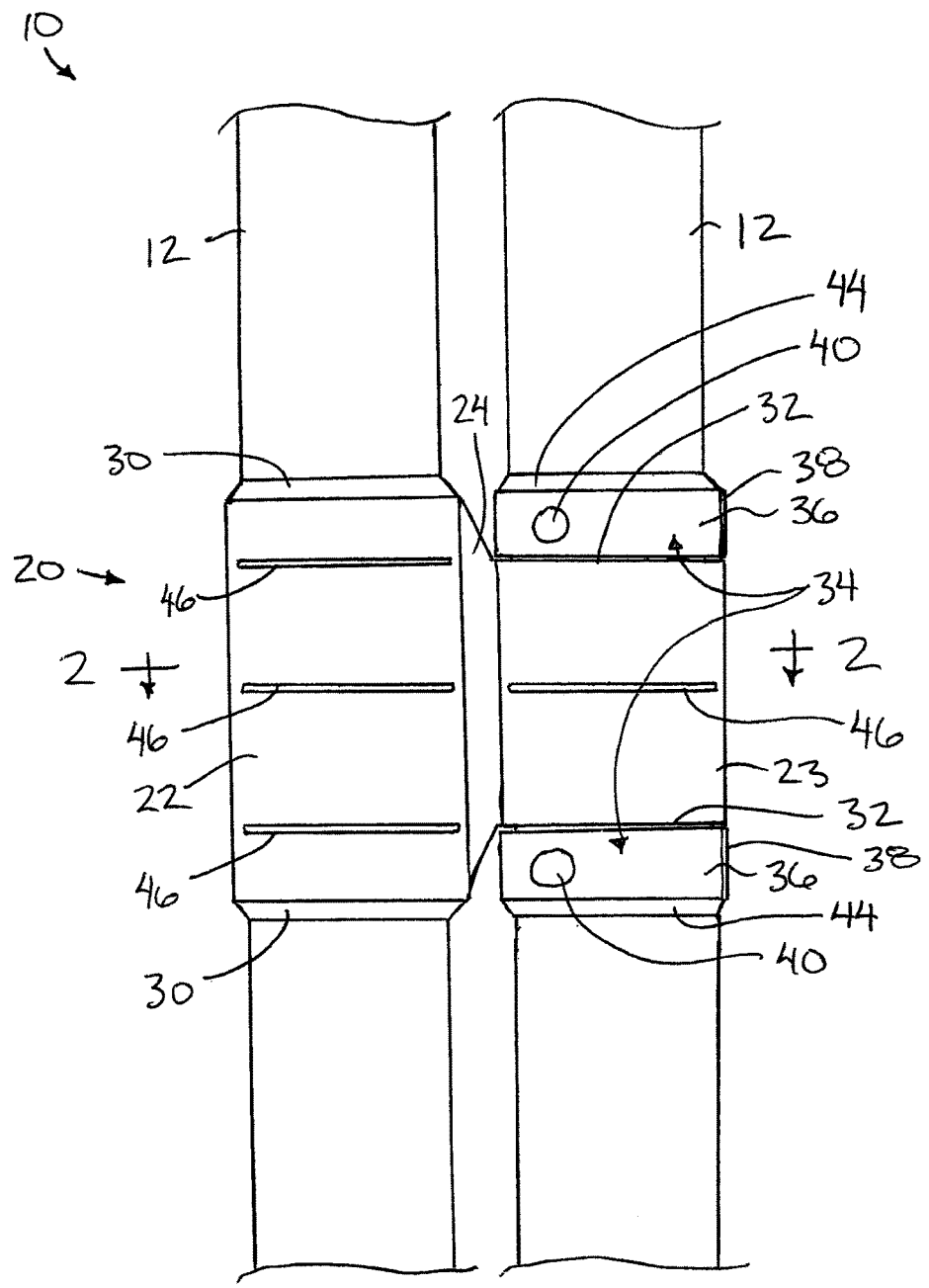
FIG. 1 is a side view of the multi-conduit coiled tubing assembly illustrating one of the clamping assemblies supported on the two coiled tubing members thereof.
Figure 2:
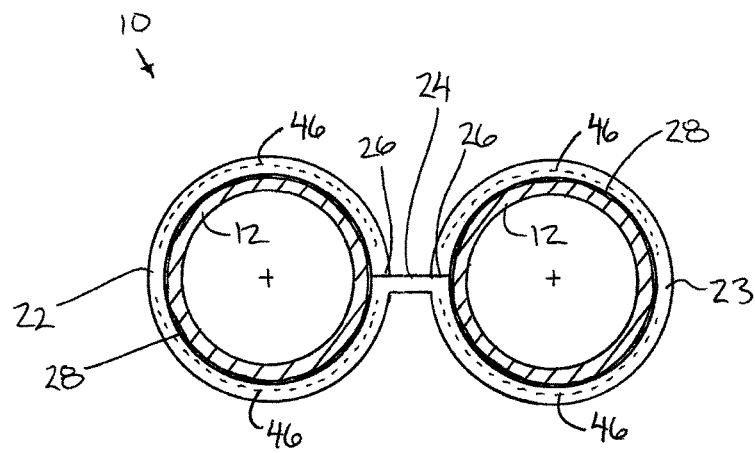
FIG. 2 is a top plan view of one of the clamping assemblies.

Referring to the accompanying figures there is illustrated a multi-conduit coiled tubing assembly generally indicated by reference numeral 10. The multi-conduit coiled tubing assembly 10 comprises a plurality of independent, continuous coiled tubing members 12 which are joined together in substantially parallel and fixed relation relative to one another. Typically the coiled tubing members are all metal tubing members which are spoolable and arranged for use in various hydrocarbon wellbore operations.

In the illustrated embodiments, the assembly comprises two tubing members; however, more tubing members may be joined together to form the tubing assembly in further embodiments. Although various embodiments are described and illustrated herein, the common features between the various embodiments will first be described.

In each instance, each coiled tubing member 12 defines its own respective conduit extending in a longitudinal direction therethrough for conveying wellbore fluids. The fluids may include produced fluids extending upwardly therethrough from the surrounding wellbore to the surface, or various injected fluids to aid in production, or hydraulic fluid which is injected downhole for driving a downhole pump and the like.

The conduits are joined with one another so as to be parallel and spaced apart with the central longitudinal axis of each conduit lying in a common plane with the other axes such that the conduits extend alongside one another along the full length thereof. The conduits are joined to one another by a plurality of clamp assemblies 20 fixed across all of the tubing members at respective clamping locations which are spaced apart from one another in the longitudinal direction, for example in the range of 5-10 meters, and more preferably near 8 meters.

The clamping assemblies span in the longitudinal direction of the tubing members a short distance, for example less than 4 inches and incorporate some ability to flex such that the clamping assemblies do not interfere with spooling of the assembled coil tubing assembly. The clamping assemblies are arranged to be installed along respective continuous sections of the tubing members at any location along the length thereof. Some portions of the clamping assemblies may be undersized relative to the outer diameter of the tubing members such that the clamping assemblies are clamped under tension about the respective tubing assemblies to be frictionally retained in position along the tubing member in addition to other mounting techniques described in further detail below.

The multi-conduit coiled tubing assembly 10 in all embodiments is typically manufactured by drawing each independent coiled tubing member 12 from its own respective drum. By connecting the ends of the tubing members, equal lengths of tubing can be drawn from each drum and passed through a suitable jig in a parallel relationship. A pressing assembly presses the clamp assemblies onto the tubing members at a prescribed spacing determined by the jig.

As each clamping assembly is mounted in position, the tubing members are drawn through the jig by the prescribed spacing for installation of the next clamp assembly. The joined portion of the tubing members are then re-spooled onto a common take-up drum as an assembled finished product. Once equal lengths of coiled tubing members have been joined together and spooled onto the common drum, the assembled product is then ready for use in a wellbore by conveying the two joined tubing members into and out of the wellbore together as a single integral tubing assembly using an appropriate coiled tubing injector unit.

Each clamp assembly 20 comprises a main body which has a first clamping portion 22 and a second clamping portion 23 for clamping about the two tubing members 12 respectively. The main body of each clamp assembly further includes a central connecting portion 24 for connecting between the two clamping portions 22 and 23 so as to span between the two parallel and spaced apart tubing members 12.

The first and second clamping portions 22 and 23 are formed integrally together with the respective connecting portion 24 within each clamp assembly such that the main body is single, integral, unitary and seamless body of uniform material. In a preferred embodiment, the clamping portions and the connecting portion therebetween are formed from a common plate metal, for example stainless steel. In further embodiments, the common plate forming the two clamping portions and the connecting portion therebetween may be formed of high tensile mild steel or other elastically deformable metals.

Figure 3:
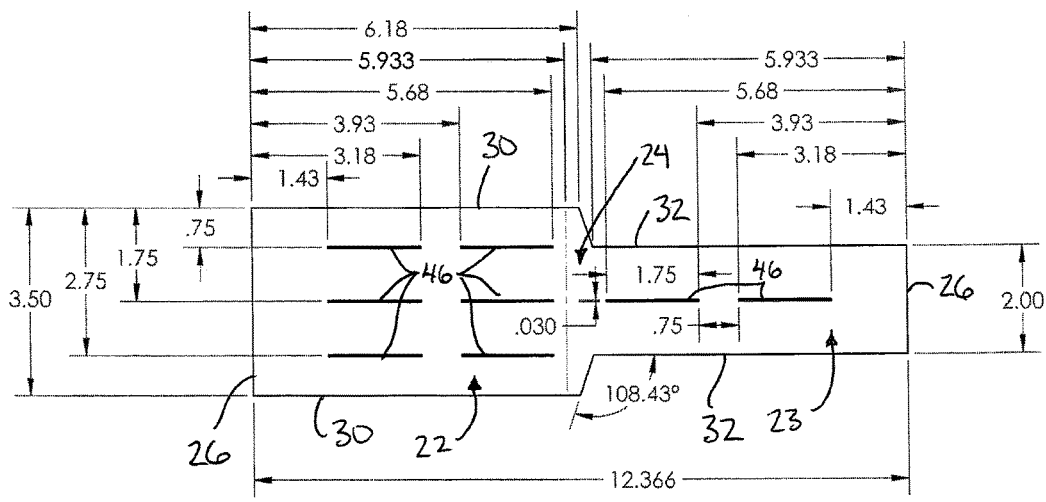
FIG. 3 is a plan view of a plate metal blank used to form one of the clamping assemblies.

As shown in FIG. 3, the two clamping portions and the connecting portion of each clamp assembly are formed from a common flat blank of metal in which the connecting portion 24 is centrally located between the first clamping portion 22 and the second clamping portion 23 which extend in opposing directions away from opposing sides of the central connecting portion towards longitudinally opposing ends 26 of the blank.

The plate metal blank is mounted to the two tubing members 12 by wrapping each clamping portion circumferentially about a respective one of the tubing members such that the central connecting portion is connected between the clamping portions so as to span between the two tubing members. More particularly, each clamping member is wrapped to extend a full circumference about the respective tubing member such that the end 26 of the blank abuts the central connecting portion 24 where a welded connection retains the clamping portion secured about the tubing member.

A liner 28 may be provided about each tubing member at the location where the respective clamping portions are wrapped such that the liner forms a tubular or annular spacer element between the outer diameter of the tubing member and the inner diameter of the respective clamping portion thereabout. The liner is preferably a consumable material, for example a paper which readily dissolves. The paper provides a very small gap in the radial direction between the tubing member and the surrounding clamping portion to ensure some freedom of movement of the clamping portion about the respective tubing member received therethrough.

The plate metal blank for forming the main body of the clamp assembly is arranged to be wider at the first clamping portion than at the second clamping portion such that the resulting first clamping portion is longer is the longitudinal direction of the respective tubing member received therethrough than the corresponding second clamping portion. In the illustrated embodiment, the first clamping portion has a resulting length in the longitudinal direction of approximately 3 inches. In contrast, the second clamping portion has a length in the longitudinal direction of approximately 2 inches. The second clamping portion is centered longitudinally relative to the first clamping portion such that the first clamping portion protrudes in the longitudinal or axial direction of the tubing members beyond both ends of the second clamping portion by a distance of approximately ½ inch. The longitudinal dimension of the central connecting portion 24 is tapered gradually from the 3 inch length of the first clamping portion to the 2 inch length of the second clamping portion.

In the assembled configuration where the first clamping portion extends about a full circumference of the respective tubing member received therethrough, the clamping portion extends axially between two longitudinally opposed outer ends 30. Each of the outer ends 30 has a chamfered edge where the outer diameter of the resulting tubular clamping portion is gradually reduced in a longitudinally outward direction at both ends.

The corresponding longitudinally opposed outer ends 32 of the second clamping portion define annular end faces which lie perpendicular to the axial or longitudinal direction as will be described in further detail below.

Each clamping assembly further includes a longitudinal positioning element 34 in the form of one or more collars 36 which are mounted in fixed relation to the second tubing member in a manner which restricts the longitudinal position of the main body of the clamping assembly relative to the tubing member without restricting relative rotation between the main body of the clamping assembly and the tubing member.

In the illustrated embodiment, the longitudinal positioning element comprises two collars 36 which are fixed to the second tubing member at longitudinally opposed ends of the second clamping portion 23 of the main body of the clamping assembly. The two collars 36 are mounted spaced apart from one another by a distance which corresponds approximately to the longitudinal length of the second clamping portion received therebetween such that the inner ends of the two collars 36 are in close proximity to the outer ends 32 of the second clamping portion therebetween. Only a small gap in the longitudinal direction is provided between the second clamping portion and each of the two collars in the longitudinal direction such that the collars are arranged to abut the opposing ends 32 of the second clamping portion in use and thereby restrict the longitudinal position of the main body of the clamping assembly when the two collars are fixed in relation to the second tubing member.

Each collar 36 is formed of a flat bar or plate of metal, for example stainless steel, or a high tensile mild steel, or other elastically deformable metals. The flat bar shown in FIG. 4 is then wrapped circumferentially about the tubing member such that the two opposing ends 38 of each flat bar are situated in close proximity to one another so as to permit welding together to form a weld seam which also functions to weld the collar in fixed relation to the tubing member received therethrough.

The flat bar forming each collar 36 also includes two weld receiving apertures 40 at longitudinally spaced positions so as to be evenly spaced between the opposing two ends 38. Once the bar is wrapped about the second tubing member to define its respective collar 36, the resulting weld apertures 40 are spaced apart from one another and from the opposing ends in the circumferential direction by approximately 60 degrees each. The weld apertures are filled with a weld material which assists in fixing the collar by welding the collar to the tubing member received therethrough. The two weld apertures 40 and the seam at the two ends 38 define three separate welds at evenly spaced positions in the circumferential direction for retaining each collar fixed to the respective tubing member received therethrough.

The length of the flat bar forming each collar may be somewhat undersized such that the collar is elastically stretched as it is mounted onto the respective tubing member. The dimension between the opposing longitudinal edges of the flat bar forming each collar is arranged to be approximately ½ inch such that the resulting collar has a length in the axial direction of approximately ½ inch. When mounting the two collars in substantial abutment in close proximity to the two outer ends 32 of the second clamping portion therebetween, the overall combined length of the second clamping portion with the two collars is approximately equal to the overall length of the first clamping portion between the opposing outer ends 30 thereof.

The inner end of each collar 36 in the longitudinal direction comprises an annular end face 42 which is perpendicular to the axial direction of the tubing member so as to be well suited for abutment with the corresponding perpendicular end faces of the outer ends 32 of the second clamping portion. The longitudinally opposed outer ends 44 of the collars 36 respectively are chamfered similarly to the outer ends 30 of the first clamping portion such that the outer diameter thereof is reduced gradually in a longitudinally outward direction away from the second clamping portion.

Each of the two clamping portions of the main body of each clamping assembly further includes at least one pair of slotted openings 46. Each pair of slotted openings locates the two slots such that they are diametrically opposed at opposing sides of a common plane within which the central longitudinal axes of the two tubular members lie. Each slotted opening 46 is elongated in a circumferential direction and extends fully through the plate forming the clamping portion from the inner surface to the outer surface thereof. The slot extends in the circumferential direction to extend through an arc of slightly less than 180 degrees, for example anywhere between 120 and 175 degrees. The slot defines a small gap in the longitudinal direction which allows some relative flexing between one section of the clamping portion above the slot and one section of the clamping portion below the slot. More particularly, when spooling the coiled tubing assembly about a spool having a respective spool axis oriented perpendicularly to the longitudinal axis of the tubular members and parallel to the common plane of the tubular members, the slots are located to allow different sections of the clamping portions to flex relative to one another corresponding to bending of the clamping assembly about the spool axis.

In the illustrated embodiment the second clamping portion includes a single pair of slotted openings 46 at a longitudinally centered location. Alternatively, the first clamping portion includes three pairs of slotted openings 36 at evenly spaced apart positions in the longitudinal direction such that a central one of the pairs of openings 46 is centrally located and longitudinally aligned with the slotted openings in the second clamping portion adjacent thereto. The other two pairs of slotted openings 46 in the first clamping member are aligned with respective ones of the gaps between the second clamping portion and the collars 36.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A coiled tubing assembly arranged for use in a wellbore, the tubing assembly comprising:
   at least two continuous coiled tubing members, each defining a respective conduit extending in a longitudinal direction and arranged to receive wellbore fluids longitudinally therethrough; and
   a plurality clamp assemblies connecting the tubing members to one another at respective clamping locations spaced apart from one another in the longitudinal direction such that the tubing members extend alongside one another in a parallel configuration;

each clamp assembly comprising:
  a clamping portion extending circumferentially about each coiled tubing member which is sized so as to allow some relative pivotal movement therebetween;
  at least one connecting portion joined between one clamping portion and at least one other adjacent clamping portion such that the clamping portions are interconnected; and
  at least one longitudinal positioning element fixed relative to one of the tubing members so as to be arranged to restrict longitudinal displacement of the clamp assembly relative to said one of the tubing members; and
  the clamp assembly being pivotal relative to the longitudinal positioning element about a longitudinal axis of the tubing member upon which the longitudinal positioning element is fixed.

2. The assembly according to claim 1 wherein the clamping portions of each clamping assembly include a first clamping portion extending circumferentially about a first one of the tubing members and a second clamping portion extending circumferentially about a second one of the tubing members and which is joined to the first clamping portion by said at least one connecting portion, and wherein the longitudinal positioning element extends circumferentially about the second one of the tubing member in fixed relation thereto.

3. The assembly according to claim 2 wherein one of the second clamping portion and the longitudinal positioning element comprises a sleeve supported concentrically on the second one of the tubing members and another one of the second clamping portion and the longitudinal positioning element comprises a pair of collars supported concentrically on the second one of the tubing members at longitudinally opposed ends of the sleeve.

4. The assembly according to claim 3 wherein there is provided an annular gap between the sleeve and each collar in the longitudinal direction of the second one of the tubing members.

5. The assembly according to claim 3 wherein the second clamping portion comprises the sleeve such that the sleeve is fixed to said at least one connecting portion and the longitudinal positioning element comprises the pair of collars such that the pair of collars are fixed to the second one of the tubing members.

6. The assembly according to claim 3 wherein each collar of the pair of collars comprises an inner annular end face arranged to abut the sleeve and an outer end face which is chamfered so as to be reduced in outer diameter in a longitudinally outward direction.

7. The assembly according to claim 2 wherein a combined length of the second clamping portion and the longitudinal positioning element along the second one of the tubing members is approximately equal to a length of the first clamping portion along the first one of the tubing members.

8. The assembly according to claim 2 wherein the first clamping portion extends longitudinally between opposing outer end faces which are chamfered so as to be reduced in outer diameter in a longitudinally outward direction.

9. The assembly according to claim 1 wherein said at least one connecting portion is connected in fixed relation to each of the clamping portions.

10. The assembly according to claim 1 wherein said at least one connecting portion and the clamping portions are integrally formed with one another as a single unitary body.

11. The assembly according to claim 1 wherein the longitudinal positioning element is welded to said one of the coiled tubing members relative to which the longitudinal positioning element is fixed.

12. The assembly according to claim 11 wherein the longitudinal positioning element is fixed by a plurality of individual welds between the longitudinal positioning element and said one of the coiled tubing members at spaced apart positions from one another.

13. The assembly according to claim 1 wherein each clamping portion includes at least one slotted opening communicating radially from an inner surface to an outer surface of the clamping portion, said at least one slotted opening being elongated in a circumferential direction so as to extend partway about a circumference of the respective coiled tubing member received through the clamping portion.

14. The assembly according to claim 1 wherein the clamping portions have respective longitudinal axes lying in a common plane and wherein said at least one slotted opening comprises a plurality of slotted openings in opposing sides of the respective clamping portion relative to said common plane.

15. The assembly according to claim 1 wherein the clamping portions and connection portion are formed of a common elastically deformable material.

16. The assembly according to claim 1 wherein the longitudinal positioning element is supported about said one of the tubing members in an elastically stretched state.

17. The assembly according to claim 1 further comprising an annular spacer element formed of consumable material mounted between each clamping portion and the respective tubing member.

18. The assembly according to claim 1 wherein the clamping portions have respective inner diameters which are substantially identical to one another.

* * * * *